Dec. 26, 1939.  W. B. COLLIER  2,184,545
BELT PULLEY
Filed Feb. 12, 1938
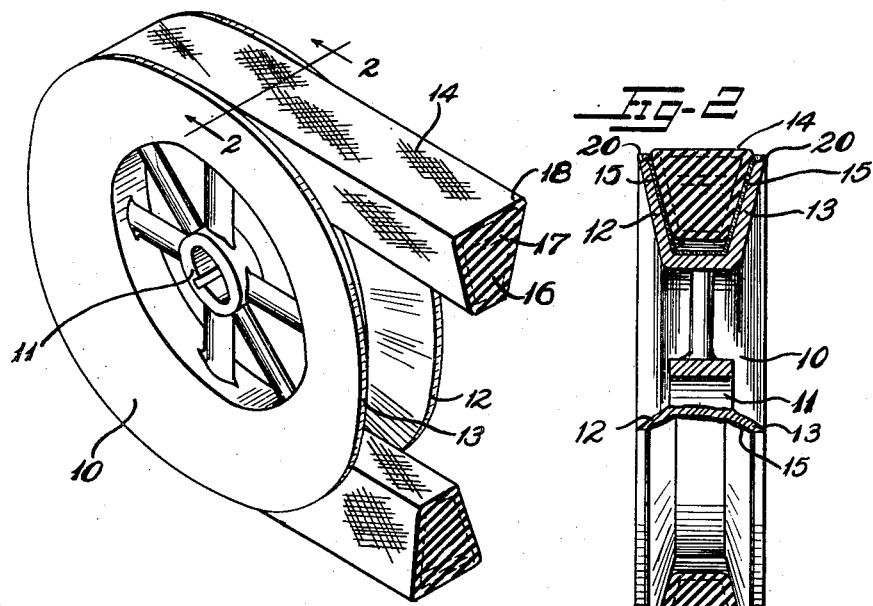
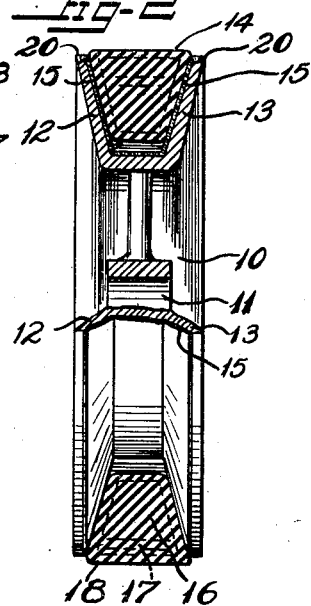
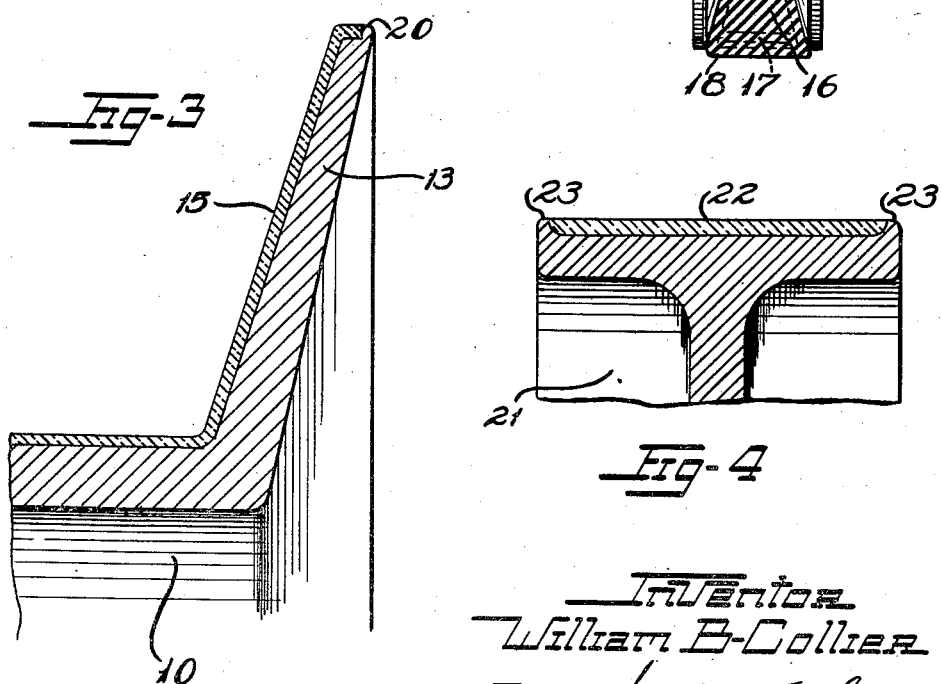
Inventor
William B. Collier
By Willis F. Avery
Atty Patented Dec. 26, 1939

2,184,545

UNITED STATES PATENT OFFICE 2,184,545

BELT PULLEY

William B. Collier, Talmage, Ohio, assignor to The B. F. Goodrich Company, New York, N. Y., a corporation of New York Application February 12, 1938, Serial No. 190,280

2 Claims. (Cl. 74—230.7)

This invention relates to pulleys and to belt and pulley installations. It is applicable to pulleys generally, including driving, driven and idler pulleys, and pulleys of grooved, flat, or conical types, although the greatest field of usefulness probably lies in installation of the V or side-driving type, either single groove or multiple groove, especially where the V-belts are of rubber and fabric construction.

An annoying problem, which so far as I am aware has not been satisfactorily solved heretofore despite the fact that it has received much attention since the side-driving belts have come into general use, has been that of avoiding or eliminating the objectionable sounds often developed at the pulley, such as squealing, screeching, chirping or other objectionable sound, all of which will be referred to herein for convenience as "squeaking". The squeaking has been troublesome especially in many cases where rubber-fabric V-belts have been used with V-groove pulleys of iron or steel. While all the causes of the squeaking are not definitely known, apparently the squeaking has been caused in a large measure by reason of the friction of the belt on the pulley, there being some sliding in the adjustment of the belt to the pulley groove at the positions of entering and leaving even when the belt as a whole does not slip on the pulley, especially under conditions conducive to the accumulation of metallic oxide and metal particles upon the pulley-contacting surfaces of the belt resulting in the formation of a glaze of such substance on the belt. The action apparently has been much the same as that of rosin on a bow drawn across a violin string, seemingly a rapidly repeated sticking and pulling away of the belt to and from the pulley surface effective to develop sound vibrations. Such squeaking has often been encountered in generator and fan drives for automobiles and in refrigerator and other drives, and it has been especially troublesome where the pulleys have been of iron or steel and moisture has had access to the pulleys to promote the oxidation. Attempts to protect the metal surface by paints have not been successful because of the inability of the paint to resist the wear of the belt rubbing against it, and pulleys of non-metallic materials such as hard rubber, fiber and Bakelite also have been undesirably susceptible to wear.

I have found that, in some cases at least, a further cause of squeaking has been the discharging at a pulley of electrical charges gathered on the belt, as at another pulley, which condition has been aggravated by the friction of the belt on the pulleys. Apparently the squeaking has resulted from the rapid discharging of the electrical charges at sound frequencies near the point of contact of the belt with the pulley.

The chief objects of the invention are to provide a pulley construction in which objectionable sounds in the operation of the belt upon it are substantially reduced, or eliminated; to provide for reducing or eliminating the accumulation of squeak-producing substances upon the belt; to provide for eliminating squeaking resulting from static discharge; to provide a belt and pulley installation that is electrically insulating and especially to provide for dissipating static charges in such an installation; to provide a belt pulley that is long wearing and that is durable in construction; and to provide for long life of the belt surface.

These and further objects will be apparent from the following description, reference being had to the accompanying drawing in which:

Fig. 1 is a perspective view of a pulley and belt assembly of the V-type, parts being broken away and sectioned.

Fig. 2 is a section taken along the line 2—2 of Fig. 1.

Fig. 3 is an enlarged fragmentary cross section of the pulley.

According to the invention I construct a pulley of materials such that the belt contacting faces of the pulley are highly resistant to wear, and so that substances which may be deposited from the pulley upon the belt face will not result in promoting or aggravating squeaking. I have discovered that these ends are satisfied by the provision of a material of the class of vitreous substances, preferably a porcelain enamel, although other vitreous substances such, for example, as glass, glazes or even frits or fused ceramics may in some cases be used. Such materials, although well suited to the purposes of the invention for eliminating squeaking and resisting wear, are however themselves quite brittle, and for the purpose of providing a pulley that is strong and durable along with its other advantages I prefer to make the body of the pulley of a strong material such as iron or steel or other metal, or wood, or suitable composition, and to provide the vitreous material at the belt-contacting faces of the pulley in such fashion that it is protected against injury.

Referring to the embodiment of the invention illustrated in Figs. 1 to 3 of the drawing, a V-pulley 10 including a shaft-engaging hub 11 is provided with side flanges 12, 13 of a shape providing a V-groove for the accommodation of a belt 14 of the V or side-driving type. The two belt-engaging faces of the pulley groove and preferably also the bottom of the groove are provided with a facing 15 of vitreous material. Porcelain enamel fused in place in the pulley groove has given excellent results. By the preferred procedure of fusing the vitreous material in place on the pulley body, which preferably has been roughened to provide a good grip on the vitreous layer, the structure becomes in effect an integral unit, and as will be understood by those skilled in the art, the materials may be selected with reference to their coefficients of expansion so that dimensional changes resulting from changes in temperature will not cause injury to the vitreous material. The strength to resist blows upon it may be enhanced by making the vitreous layer quite thin, good results having been obtained with a porcelain enamel layer on the belt-contacting surfaces of the pulley of from .004 inch to .012 inch in thickness. It is desirable for some uses to protect the edges of the vitreous layer, and for that purpose the pulley flange may be shouldered as at 20 to shield such edge.

While it is preferred to fuse the vitreous layer in place on the pulley, this layer may be applied by other means. For example, this layer may be pre-formed in the proper shape and then mounted and secured as by adhesion to the pulley body, either in sections, or as rings which may be applied by the removal of detachable pulley flanges.

The V-belt illustrated comprises a body 16 of rubber composition in which are embodied one or more layers 17 of cord, fabric, or other stretch-resisting material and around which is an enclosing cover 18 of fabric, preferably bias-laid and rubber-impregnated, the whole belt structure being vulcanized together.

Apparently the success of the vitreous layer 15 in inhibiting squeaking results at least in part from the fact that the vitreous material has a rate of wear far less than other materials which have been customarily used for belt pulleys, such, for example, as iron, steel and other metals, pressed fiber compositions, heat-setting resins and hard rubber and other compositions, all of which have been subject to rapid wearing by the belt. In the improved construction very little wear of the belt-contacting face of the pulley is noticeable and the material thus worn off and deposited in the fabric of the belt cover is not found to result in the development of a highly glazed belt surface such as has been common with the use of other pulleys, for example, iron or steel pulleys. The vitreous surfaces provides a very smooth action of the belt upon it with very little, if any, of the alternate sticking and releasing action of the prior constructions, and the smoothness of operation as well as the absence of objectionable film deposits on the belt has been found to obtain for long periods of operation. This resulted in quietness of operation and also materially reduced wear of the belt as well as of the pulley.

Despite the fragile nature of vitreous material itself, the improved pulley construction is strong and durable, since the vitreous layer 15 is well supported and reinforced and is well sheltered by the pulley body so that it is protected against direct impacts.

While the pulley body may be of steel or other electrically conductive material the vitreous layer 15 affords an electrical insulation and this makes possible the use in the belt cover 18 of carbon particles or other conductive material so that the dielectric properties of the belt surface may be considerably reduced without, however, providing objectionable conductivity of the installation as a whole. This is desirable in some installations with electrical apparatus where it is desired for the sake of safety that there be an interruption of objectionable conductivity between the power source and the driven mechanism. The inclusion of the carbon particles or other conductive material in the belt surface has the advantage that static accumulations are substantially reduced or eliminated, the conductive belt surfaces having the advantage of distributing and thereby attenuating electrical charges throughout the belt surface and also apparently facilitating the discharges of the electrical charges directly into the atmosphere. This in turn has the advantage of eliminating annoying sparking from static charges and of thereby eliminating the objectionable noises resulting from such discharges as well as reducing fire hazards.

In some installations the driving and driven pulleys all may be constructed in accordance with the invention, while in other installations only one of the pulleys need be of the improved construction for satisfactory elimination of squeaks and static difficulties and for longer life of the pulley and belt. While the invention has probably its greatest field of usefulness in pulley and belt installations of the side-driving type, it will be found useful also in pulley and belt installations of the combined V and flat type and also of the flat type.

In Fig. 4 is shown an application of the invention to a pulley 21 of the flat type. A layer 22 of vitreous material is provided at the belt-contracting face of the pulley. For protection of the edges of the vitreous layer this layer may be inset in a shallow recess in the pulley face so that these edges will be shielded by shoulders 23, 23 at the margins of the pulley face.

These and further variations may be made without departing from the scope of the invention except as it is defined in the following claims.

I claim:

1. A belt pulley adapted to minimize belt-squeaking, said pulley comprising a supporting body of non-vitreous material having a concentric portion of approximately belt-supporting size and a thin, belt-contacting facing of vitreous material fused in place on said portion.

2. A V-belt pulley adapted to minimize belt-squeaking, said pulley comprising a supporting body of non-vitreous material having a peripheral groove the tapered belt supporting walls of which exceed slightly belt-supporting width, and a thin, belt-contacting facing of vitreous material fused in place upon said walls.

WILLIAM B. COLLIER.